United States Patent
Iwao et al.

(10) Patent No.: US 10,659,711 B2
(45) Date of Patent: May 19, 2020

(54) SOLID-STATE IMAGING APPARATUS

(71) Applicant: SHARP KABUSHIKI KAISHA, Sakai, Osaka (JP)

(72) Inventors: Tatsuki Iwao, Sakai (JP); Takuji Urata, Sakai (JP); Yoshinao Morikawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/147,753

(22) Filed: Sep. 30, 2018

(65) Prior Publication Data
US 2019/0166322 A1    May 30, 2019

(30) Foreign Application Priority Data

Nov. 28, 2017  (JP) ................................. 2017-228284

(51) Int. Cl.
| | |
|---|---|
| *H04N 5/376* | (2011.01) |
| *H04N 5/378* | (2011.01) |
| *H04N 5/345* | (2011.01) |
| *H04N 5/232* | (2006.01) |

(52) U.S. Cl.
CPC ......... *H04N 5/376* (2013.01); *H04N 5/23227* (2018.08); *H04N 5/3454* (2013.01); *H04N 5/378* (2013.01); *G03B 2206/00* (2013.01)

(58) Field of Classification Search
CPC ...... H04N 5/376; H04N 5/3454; H04N 5/378; G03B 2206/00
See application file for complete search history.

(56) References Cited

U.S. PATENT DOCUMENTS

| | | | | |
|---|---|---|---|---|
| 4,910,599 A | * | 3/1990 | Hashimoto | .......... H04N 5/3454 348/240.2 |
| 5,166,781 A | * | 11/1992 | Walby | .................... H04N 9/642 348/536 |
| 5,367,337 A | * | 11/1994 | Pyle | ........................ H04N 5/04 348/521 |
| 6,597,399 B2 | * | 7/2003 | Horii | .................... H04N 5/3454 250/208.1 |
| 7,336,303 B2 | * | 2/2008 | Shimomura | .......... G06T 3/4007 348/240.2 |
| 8,587,699 B2 | * | 11/2013 | Aoki | ..................... H01L 27/146 348/245 |
| 2004/0174439 A1 | * | 9/2004 | Upton | .................... H04N 3/155 348/222.1 |
| 2005/0162529 A1 | * | 7/2005 | Nakasuji | .................. H04N 5/20 348/222.1 |
| 2008/0002036 A1 | | 1/2008 | Ohwa | |

FOREIGN PATENT DOCUMENTS

| | | |
|---|---|---|
| JP | 2008-016977 A | 1/2008 |
| JP | 2008-118698 A | 5/2008 |

\* cited by examiner

*Primary Examiner* — Shahbaz Nazrul
(74) *Attorney, Agent, or Firm* — ScienBiziP, P.C.

(57) ABSTRACT

There is provided a solid-state imaging apparatus including a driving device that reads image data from an imaging unit. When reading the image data from the imaging unit, the driving device renders the image data composed of image data having V rows and H columns and blanking data having V' rows and H' columns, and renders the amount of the image data changeable for at least every one frame.

7 Claims, 5 Drawing Sheets

SOLID-STATE IMAGING APPARATUS

BACKGROUND

1. Field

The present disclosure relates to a solid-state imaging apparatus.

2. Description of the Related Art

Conventionally, during image transfer performed by using solid-state imaging elements, such as complementary metal-oxide semiconductor (CMOS) image sensors and charge-coupled device (CCD) image sensors, data of a fixed number of pixels is not able to continue being transferred at a fixed frame rate (Japanese Unexamined Patent Application Publication No. 2008-118698 and Japanese Unexamined Patent Application Publication No. 2008-16977). The reason is that, it would be desirable if an internal clock having an integer ratio relationship with the clock of an external frame rate were generated, but the transfer speed of a certain block does not match the internal clock, and as a result, an internal clock having a non-integer ratio relationship with the clock of an external frame rate is applied. Hence, there is a problem in which the internal frame rate is slightly different from the external frame rate.

To address the above-described problem, a conventional solid-state imaging element has a horizontal blanking mechanism. Although the conventional horizontal blanking mechanism can improve the above-described problematic condition, it is not capable of completely resolving the issue.

An aspect of the present disclosure provides a solid-state imaging apparatus capable of accurately controlling a frame rate for image transfer of a solid-state imaging element.

SUMMARY

To address the above-described problems, a solid-state imaging apparatus according to an aspect of the disclosure includes a driving device that reads image data from an imaging unit. When reading the image data from the imaging unit, the driving device renders the image data composed of image data having V rows and H columns and blanking data having V' rows and H columns and renders the image data capable of changing an amount of data for at least every one frame.

DESCRIPTION OF THE EMBODIMENTS

First Embodiment

A first embodiment of the present disclosure is described in detail below. First, a typical horizontal blanking mechanism is briefly described with reference to FIGS. 2 and 3.

Figure 2:
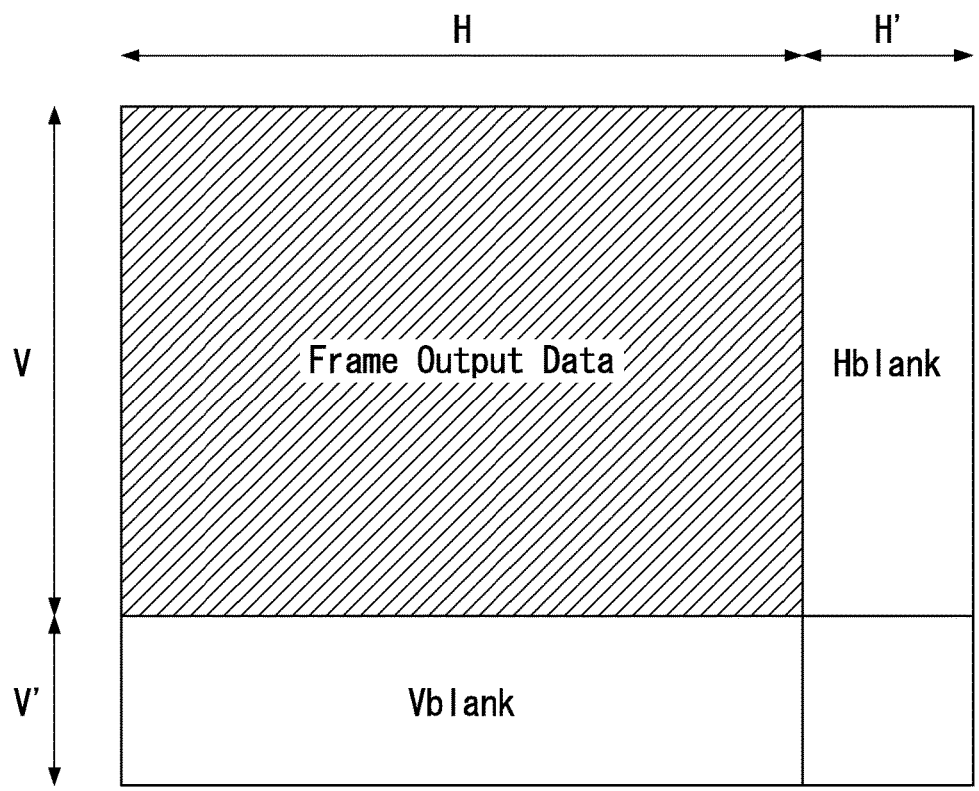
FIG. 2 is a schematic diagram illustrating a data content of one image composed of a pixel portion and blanking portions.

FIG. 2 is a schematic diagram illustrating a data content of one image composed of a pixel portion and blanking portions. As illustrated in FIG. 2, the pixel portion (Frame Output Data) including an Image area is defined by H columns and V rows, and the blanking portions (Hblank and Vblank) are defined by H' columns and V' rows. H, H', V, and V' are each an integer because H columns, H' columns, V rows, and V' rows are determined by the number of pixels.

Figure 3:
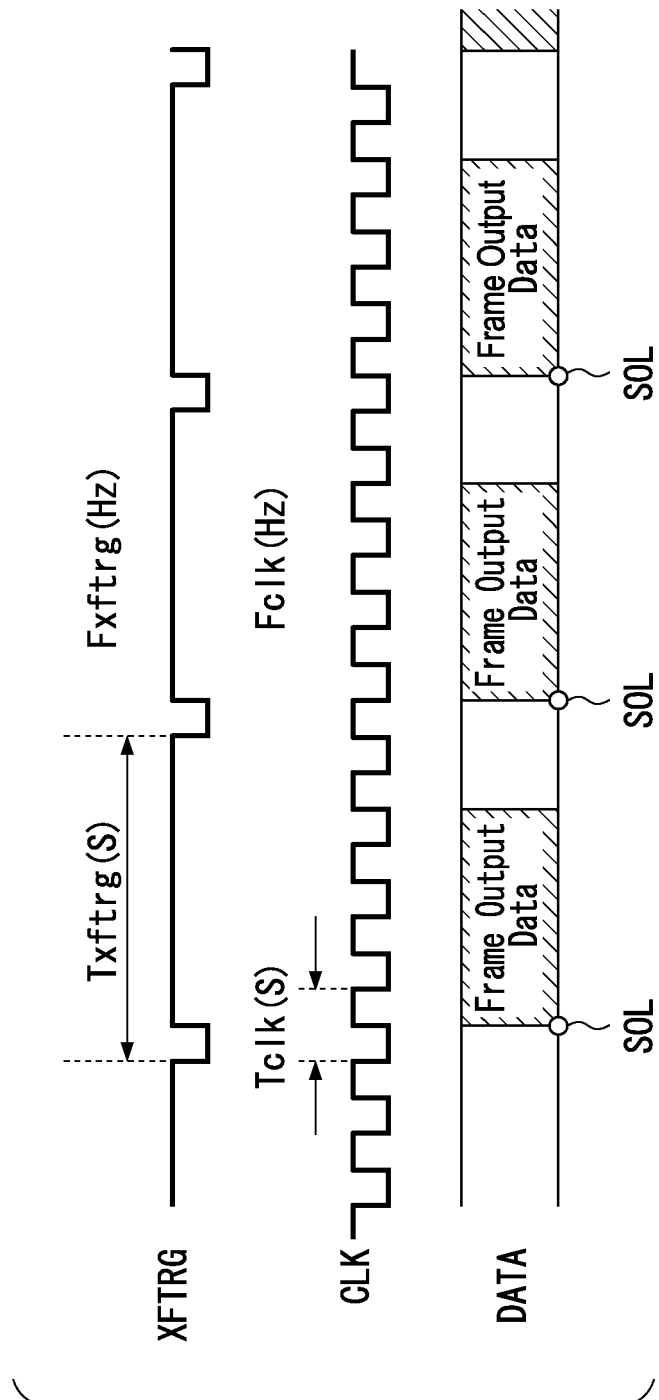
FIG. 3 is a timing chart illustrating the timing at which a general horizontal blanking mechanism transfers data illustrated in FIG. 2.

FIG. 3 is a timing chart illustrating the timing at which the horizontal blanking mechanism transfers data illustrated in FIG. 2. A frame rate is defined by an XFTRG signal, which is an external signal that is input from outside the solid-state imaging apparatus, and a CLK signal, which is an internal signal generated to synchronize with the XFTRG signal in the solid-state imaging apparatus. The cycle period and the frequency of the XFTRG signal are Txftrg (s) and Fxftrg (Hz), respectively. The cycle period and the frequency of the CLK signal are Tclk (s) and Fclk (Hz), respectively. In FIG. 3, transferring data of one image starts at the timing when both the XFTRG signal and the CLK signal rise.

H columns, H' columns, V rows, V' rows, Txftrg, Fxftrg, Tclk, and Fclk preferably satisfy equation (1).

$$T_{xftrg} = (H + H')(V + V')T_{clk} = \frac{1}{F_{xftrg}} \qquad (1)$$

Since Tclk=1/Fclk, equation (1) turns to equation (2).

$$(H + H')(V + V')\frac{1}{F_{clk}} = \frac{1}{F_{xftrg}} \qquad (2)$$

Moving 1/Fclk on the left-hand side of equation (2) to the right-hand side of equation (2) results in equation (3).

$$(H + H')(V + V') = \frac{F_{clk}}{F_{xftrg}} = n(n \in Z) \qquad (3)$$

Here, the value of the XFTRG signal as the external signal (the external clock) is usually a real number. If the CLK signal can be generated such that the ratio between Fxftrg and Fclk is an integer ratio, the value of the right-hand side of equation (3) can be an integer. However, the transfer speed of a certain block is not able to be selected to satisfy the above condition. Therefore, the value of the right-hand side of equation (3) is thus not able to be an integer. As a result, the value of the right-hand side of equation (3) is a real number but not an integer, and therefore, as expressed by inequality (4), the left-hand side of equation (3) is not equal to the right-hand side of equation (3).

$$n = (H + H')(V + V') \neq \frac{F_{clk}}{F_{xftrg}} \quad (n \in Z) \quad (4)$$

The differences resulting from the inequality between the left-hand side and the right-hand side of inequality (4) are accumulated. This causes the problem in which a frame rate is not able to be a fixed rate.

In response to this, in a typical horizontal blanking mechanism, the number of V rows and the number of H' columns are increased or decreased by 1 per fixed time period (here, increased or decreased by one pixel unit). Consequently, the problem of the above-described accumulated differences is resolved, thereby maintaining the synchronization between the frame rate and data transfer.

The present inventors gave consideration to eliminating the above-described operation, which has been applied to the typical horizontal blanking mechanism, in which the number of V' rows and the number of H' columns are increased or decreased by 1, and as a result, provided the present disclosure.

The present disclosure describes features below, but a description of a general technique of a solid-state imaging apparatus is omitted.

Figure 1:
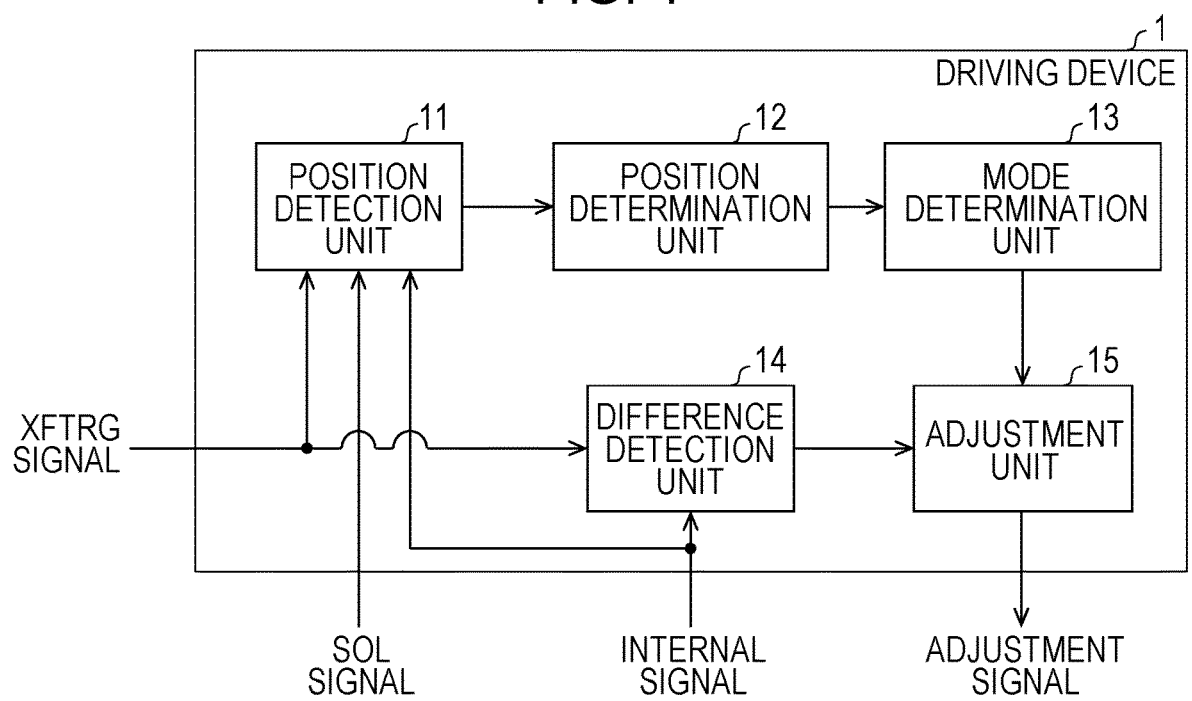
FIG. 1 is a block diagram schematically illustrating a configuration of a driving device included in a solid-state imaging apparatus according to a first embodiment of the present disclosure.

FIG. 1 is a block diagram schematically illustrating a configuration of a driving device included in a solid-state imaging apparatus according to a first embodiment of the present disclosure. A driving device 1 includes a position detection unit 11, a position determination unit 12, a mode determination unit 13, a difference detection unit 14, and an adjustment unit 15. The driving device 1 controls processing for reading image data from an imaging unit (not shown) having an imaging plane along which multiple photoelectric conversion elements are disposed. Functions of the position detection unit 11, the position determination unit 12, the node determination unit 13, the difference detection unit 14, and the adjustment unit 15 are described below. It is noted that the configuration of the driving device 1 schematically illustrated in FIG. 1 also indicates a configuration of each of the driving devices according to the second to fifth embodiments described below.

In the solid-state imaging apparatus according to the first embodiment of the present disclosure, for the driving device 1 to synchronize a frame rate with data transfer without any difference, the difference detection unit 14 detects a difference between the left-hand side and the right-hand side of inequality (4) in accordance with the XFTRG signal and an internal signal, and the adjustment unit 15 outputs an adjustment signal based on the detection result obtained by the difference detection unit 14 and renders the value of the left-hand side of inequality (4) as close as possible to the real number of the right-hand side.

Figure 4:
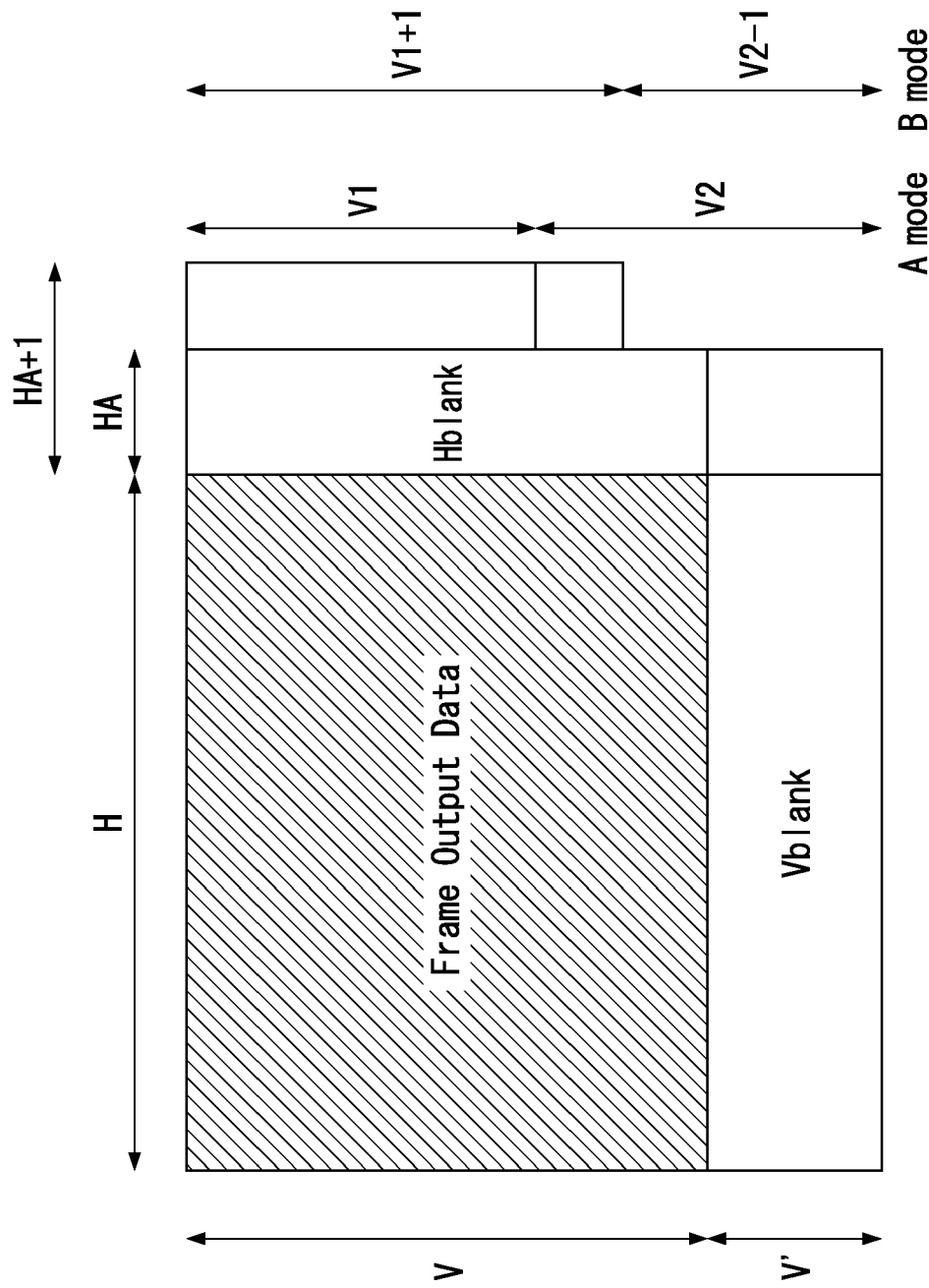
FIG. 4 is a schematic diagram illustrating a data content of one image composed of a pixel portion and blanking portions according to the first embodiment.

FIG. 4 is a schematic diagram illustrating a data content of one image composed of a pixel portion and blanking portions according to the first embodiment. As illustrated in FIG. 4, V1 rows and V2 rows are set as rows in one image, where the width of H columns for V1 rows is HA and the width of H columns for V2 rows is HA+1; in other words, the width of H columns for V1 rows differs from the width of H columns for V2 rows by one pixel.

In the general horizontal blanking mechanism, all rows are increased or decreased by one pixel. As a result, the difference between the frame rate and data transfer increases.

According to this embodiment, by controlling the increasing or decreasing of all rows of one image by one pixel, the frame rate is accurately controlled.

It is noted that increasing or decreasing all rows of one image by one pixel is merely an example and that an embodiment of the present disclosure is basically increasing or decreasing by an arbitrary unit-clock time. For example, when one pixel is output as a 10-bit signal (since outputting one bit needs one clock, outputting ten bits needs ten clocks), increasing or decreasing by one clock unit (one clock desired for outputting one bit) desired for outputting 1/10 pixel can be applied.

Second Embodiment

When appropriate integers are selected for HA, V1 rows, and V2 rows of the first embodiment, inequality (4) is expressed as equations (5) and (6) by using fractions α and β. It is noted that n is the greatest integer not exceeding Fclk/Fxftrg.

A mode: $H(V+V')+(H_A+1)V_1+H_A V_2+\alpha=n+\alpha(0\leq\alpha<1:$
$\alpha \in R)$ (5)

B mode: $H(V+V')+(H_A+1)(V_1+1)+H_A(V_2-1)+\beta=n+1+$
$\beta(-1\leq\beta\leq1: \beta\in R)$ (6)

For N-bit signal, α of equation (5) and β of equation (6) are expressed by using integers p and q of N bit, and fractions.

$$\alpha = \left(\frac{q_1}{p_1}\right)_{Nbit} + \alpha' \quad (7)$$

$$\beta = \left(\frac{q_2}{p_2}\right)_{Nbit} + \beta' \quad (8)$$

In this case, by performing adjustment by one pixel q times out of p times, a frame rate can be controlled more accurately.

For example, in a case of a 3-bit signal, when α is 0.42195 in accordance with equation (7), the fraction α' is expressed as equation (9).

$$\alpha = 0.42195 = 0.25 + 0.125 + 0.04695 = \frac{3}{8} + 0.04695 = \left(\frac{011}{111}\right)_{3bit} + \alpha' \quad (9)$$

In this case, by performing adjustment by one pixel three times out of eight times, a frame rate can be controlled more accurately than the first embodiment.

Third Embodiment

Even when there are a shift of the fraction α' and a shift of the fraction β' that are not able to be removed in the second embodiment, the shifts are caused to fall within a given range by using a SOL (Start of Line) signal, thereby avoiding artificial control.

In this embodiment, two modes (A mode and B mode) of the second embodiment are used. For example, before the SOL signal is shifted from the XFTRG signal and exceeds a given range while operating in the A mode, the operation is switched to the B mode. The shift direction is reversed in response. Subsequently, by likewise automatically switching the mode, the SOL signal is caused to fall within a given control range. This enables permanent control of the XFTRG signal and data transfer within a fixed range. Any artificial adjustment is thus unnecessary.

Figure 5:
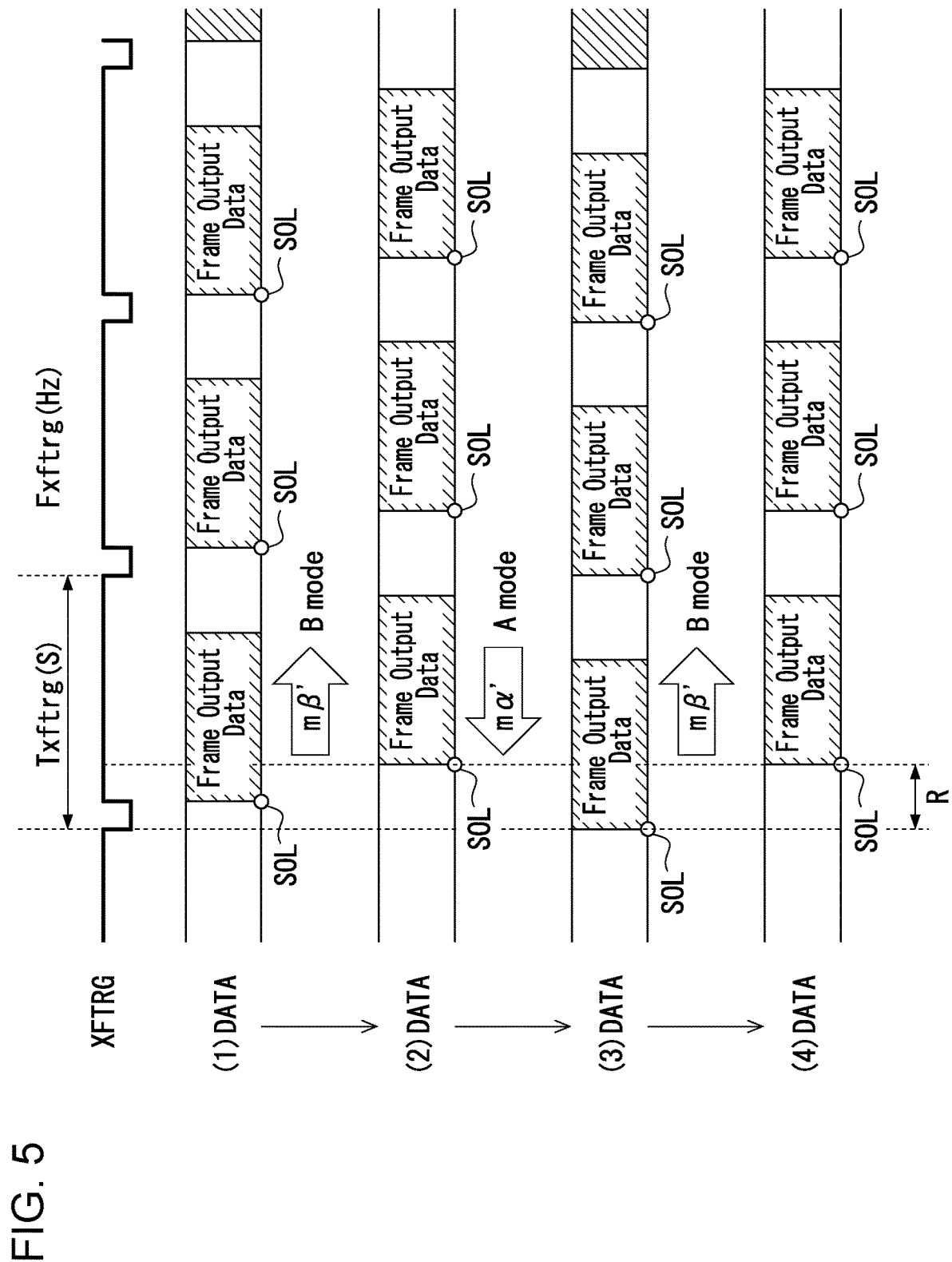
FIG. 5 is a timing chart illustrating the timing at which a horizontal blanking mechanism according to the first embodiment transfers data illustrated in FIG. 4.

Referring to FIG. 5, this embodiment is more specifically described. FIG. 5 is a timing chart illustrating the timing at which a horizontal blanking mechanism according to this embodiment transfers data illustrated in FIG. 4.

As illustrated in FIG. 4, in both the A mode and the B mode, even if adjustment is performed q times out of p times, above-described α' or β' is omitted.

For example, as expressed by equation (9), when a decimal number of 0.42195 is expressed in the binary system, 0.42195 (expressed in the decimal system)=0.25+ 0.125+0.04695 (expressed in the decimal system)=0.01+ 0.001+α' (expressed in the binary system).

In a case of a 3-bit signal, the fraction α' is equal to or less than 0.001 (expressed in the binary system) and is not able to be expressed as a 3-bit signal. Hence, the fraction α' is omitted. The same holds for the fraction β'.

As a result, the position of Frame Output Data with respect to the XFTRG signal is gradually shifted. More specifically, the position of Frame Output Data moves close to the XFTRG signal in the A mode and moves away from the XFTRG signal in the B mode.

The SOL signal at the beginning of Frame Output Data is thus utilized. The SOL signal is controlled to fall within a control range R.

For example, in a case of the A mode, the SOL signal moves close to the XFTRG signal. The position detection unit 11 detects the position of the SOL signal in accordance with the XFTRG signal and the internal signal (the CLK signal). The position determination unit 12 determines that the position of the SOL signal exceeds the end of the control range R in accordance with the detection result obtained by the position detection unit 11. According to the determination result obtained by the position determination unit 12, the mode determination unit 13 determines to switch from the A mode to the B mode. The adjustment unit 15 outputs an adjustment signal based on the determination result obtained by the mode determination unit 13 and performs the B mode.

The SOL signal gradually moves close to the beginning of the control range R. The position detection unit 11 detects the position of the SOL signal in accordance with the XFTRG signal and the internal signal. The position determination unit 12 determines that the position of the SOL signal exceeds the beginning of the control range R in accordance with the detection result obtained by the position detection unit 11. According to the determination result obtained by the position determination unit 12, the mode determination unit 13 determines to switch from the B mode to the A mode. The adjustment unit 15 outputs an adjustment signal based on the determination result obtained by the mode determination unit 13 and performs the A mode.

Subsequently the A mode and the B mode are likewise switched alternately. In such a manner, the degree of a shift of the SOL signal with respect to the XFTRG signal can be caused to fall within the control range R. If the A mode and the B mode are not automatically switched, to dissolve a shift of Frame Output Data with respect to the XFTRG signal, switching from the A mode to the B mode or from the B mode to the A mode needs to be artificially performed. This switching is performed by, for example, changing the register value. With this embodiment, such changing the register value is unnecessary.

Fourth Embodiment

Figure 6:
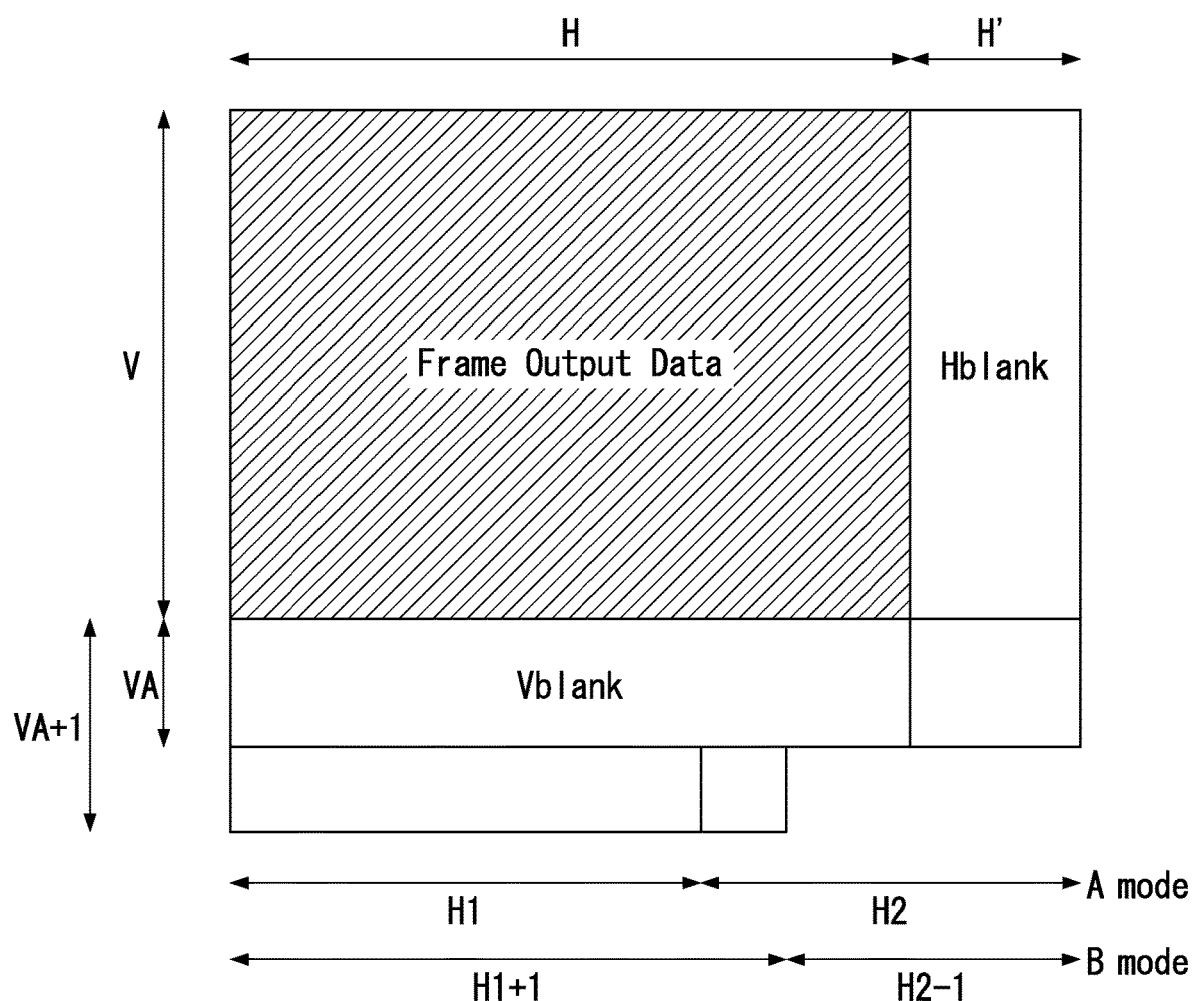
FIG. 6 is a schematic diagram illustrating a data content of one image composed of a pixel portion and blanking portions according to a fourth embodiment of the present disclosure.

The above-described first embodiment is also applicable to a vertical blanking mechanism. FIG. 6 is a schematic diagram illustrating a data content of one image composed of a pixel portion and blanking portions according to a fourth embodiment of the present disclosure.

Since a general vertical blanking mechanism increases or decreases all rows by one pixel, the difference is too large to adjust a frame rate. This embodiment controls increasing or decreasing by one pixel, thereby accurately controlling a frame rate.

Fifth Embodiment

The above-described second embodiment is also applicable to a vertical blanking mechanism. The fractions α and β that satisfy equations (14) and (15) described below also satisfy above-described equations (7) and (8). Accordingly, similar to the second embodiment, by performing adjustment by one pixel q times out of p times, a frame rate can be more accurately controlled.

Sixth Embodiment

The above-described third embodiment is applicable to a vertical blanking mechanism. In the same manner as in the third embodiment, by repeating the A mode and the B mode, the XFTRG signal and data transfer can be permanently controlled within a fixed range. Hence, artificial adjustment is unnecessary.

Other Embodiments

Blanking adjustment performed by increasing or decreasing rows or columns by one pixel is described as an example in the above-described first to sixth embodiments, but the present disclosure is not limited to this example. It is noted that the first to sixth embodiments are made in consideration of facilitating understanding of the present disclosure.

For example, adjustment may be arbitrarily set such that columns of two pixels are added for one row, no column is added or deleted for a subsequent row, and a column of one pixel is added for a row after the subsequent row. The number of increases or decreases may be set in accordance with a transfer mode.

It is noted that in the present disclosure adjustment can be performed by increasing or decreasing by not a pixel unit but an arbitrary unit clock time as described above.

[Conclusion]

A solid-state imaging apparatus according to a first aspect of the present disclosure includes a driving device that reads image data from an imaging unit. When reading the image data from the imaging unit, the driving device renders the image data composed of image data having V rows and H columns and blanking data having V' rows and H' columns and renders the amount of the image data changeable for at least every one frame.

With this configuration, a frame rate for image transfer performed by a solid-state imaging element can be accurately controlled.

The solid-state imaging apparatus according to a second aspect of the present disclosure may be such that, in the first aspect, the driving device changes the V' rows of the blanking data.

The solid-state imaging apparatus according to a third aspect of the present disclosure may be such that, in the first aspect, the driving device changes the H' columns of the blanking data.

The sold-state imaging apparatus according to a fourth aspect of the present disclosure may be such that, in the first aspect, the driving device changes both the V' rows and the H' columns of the blanking data.

The solid-state imaging apparatus according to a fifth aspect of the present disclosure may be such that, in the fourth aspect, the V' rows and H' columns of the blanking data satisfy inequalities (10) and (11):

$$n = (H + H')(V + V') \leq \frac{F_{clk}}{F_{xftrg}} < (H + H')(V + V' + 1) \ (n \in Z) \quad (10)$$

$$n = (H + H')(V + V') \leq \frac{F_{clk}}{F_{xftrg}} < (H + H' + 1)(V + V') \ (n \in Z) \quad (11)$$

where Fxftrg is the frequency of an XFTRG signal that is input from outside the solid-state imaging apparatus and Fclk is the frequency of a CLK signal that is generated inside the solid-state imaging apparatus to synchronize with the XFTRG signal.

The solid-state imaging apparatus according to a sixth aspect of the present disclosure may be such that, in any of the first to fifth aspects, the driving device reads the image data that satisfies equations (12) or (13):

$$A \text{ mode: } H(V + V') + (H_A + 1)V_1 + H_A V_2 + \alpha = \quad (12)$$

$$\frac{F_{clk}}{F_{xftrg}} \ (0 \leq \alpha < 1 : \alpha \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, V1 is the quantity of rows that constitute some rows of one image and for which the width of the H' columns is HA+1, and V2 is the quantity of rows that constitute some rows of the one image and for which the width of the H' columns is HA;

$$B \text{ mode: } H(V + V') + (H_A + 1)(V_1 + 1) + H_A(V_2 - 1) + \beta = \quad (13)$$

$$\frac{F_{clk}}{F_{xftrg}} \ (-1 < \beta \leq 0 : \beta \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, V1+1 is the quantity of rows that constitute some rows of one image and for which the width of the H' columns is HA+1, and V2−1 is the quantity of rows that constitute some rows of the one image and for which the width of the H' columns is HA.

The solid-state imaging apparatus according to a seventh aspect of the present disclosure may be such that, in any of the first to fifth aspects, the driving device reads the image data that satisfies equations (14) or (15):

$$A \text{ mode: } (H + H')V + H_1(V_A + 1) + H_2 V_A + \alpha = \quad (14)$$

$$\frac{F_{clk}}{F_{xftrg}} \ (0 \leq \alpha < 1 : \alpha \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, H1 is the quantity of columns that constitute some columns of one image and for which the height of the V' rows is VA+1, and H2 is the quantity of columns that constitute some columns of the one image and for which the height of the V' rows is VA;

$$B \text{ mode: } (H + H')V + (H_1 + 1)(V_A + 1) + (H_2 - 1)V_A + \beta = \quad (15)$$

$$\frac{F_{clk}}{F_{xftrg}} \ (-1 < \beta \leq 0 : \beta \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, H1+1 is the quantity of columns that constitute some columns of one image and for which the height of the V' rows is VA+1, and H2−1 is the quantity of columns that constitute some columns of the one image and for which the height of the V' rows is VA.

The solid-state imaging apparatus according to an eighth aspect of the present disclosure may be such that, in the sixth aspect, the width of the H' columns of the blanking data is changeable for at least every one frame.

The solid-state imaging apparatus according to a ninth aspect of the present disclosure may be such that, in the seventh aspect, the height of the V' rows of the blanking data is changeable for at least every one frame.

The solid-state imaging apparatus according to a tenth aspect of the present disclosure nay be such that, in any of the sixth to ninth aspects, the aforementioned the A mode and the B mode are alternately switched.

The present disclosure is not limited to the above-described embodiments, various modifications may be made within the meaning and range of the claims, and embodiments obtained by combining technical means disclosed in respective different embodiments as appropriate are also embraced in the range of techniques of the present disclosure. Furthermore, novel technical features can be developed by combining technical means disclosed in respective different embodiments.

The present disclosure contains subject matter related to that disclosed in Japanese Priority Patent Application JP 2017-228284 filed in the Japan Patent Office on Nov. 28, 2017, the entire contents of which are hereby incorporated by reference.

What is claimed is:
1. A solid-state imaging apparatus comprising:
a driving device that reads image data from an imaging unit, wherein
the driving device,
when reading the image data from the imaging unit, renders the image data composed of image data having V rows and H columns and blanking data having V' rows and H' columns, and
renders an amount of the image data changeable for at least every one frame so as to change the V' rows and the H' columns of the blanking data, wherein
the V rows and H' columns of the blanking data satisfy inequalities (1) and (2):

$$n = (H+H')(V+V') \le \frac{F_{clk}}{F_{xftrg}} < (H+H')(V+V'+1) \ (n \in Z) \quad (1)$$

$$n = (H+H')(V+V') \le \frac{F_{clk}}{F_{xftrg}} < (H+H'+1)(V+V') \ (n \in Z) \quad (2)$$

where Fxftrg is a frequency of an XFTRG signal that is input from outside the solid-state imaging apparatus, Fclk is a frequency of a CLK signal that is generated inside the solid-state imaging apparatus to synchronize with the XFTRG signal and Z is an integer.

2. A solid-state imaging apparatus comprising:
a driving device that reads image data from an imaging unit, wherein
the driving device,
when reading the image data from the imaging unit, renders the image data composed of image data having V rows and H columns and blanking data having V' rows and H' columns, and
renders an amount of the image data changeable for at least every one frame, wherein the driving device reads the image data that satisfies equations (3) or (4):

$$A \text{ mode: } H(V+V') + (H_A+1)V_1 + H_A V_2 + \alpha = \quad (3)$$

$$\frac{F_{clk}}{F_{xftrg}} \ (0 \le \alpha < 1 : \alpha \in R)$$

where Fxftrg is a frequency of an XFTRG signal that is input from outside the solid-state imaging apparatus, Fclk is a frequency of a CLK signal that is generated inside the solid-state imaging apparatus to synchronize with the XFTRG signal, V1 is a quantity of rows that constitute some rows of one image and for which a width of the H' columns is HA+1, V2 is a quantity of rows that constitute some rows of the one image and for which the width of the H' columns is HA, and R is a real number;

$$B \text{ mode: } H(V+V') + (H_A+1)(V_1+1) + H_A(V_2-1) + \beta = \quad (4)$$

$$\frac{F_{clk}}{F_{xftrg}} \ (-1 < \beta \le 0 : \beta \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, V1+1 is a quantity of rows that constitute some rows of one image and for which the width of the H' columns is HA+1, V2−1 is a quantity of rows that constitute some rows of the one image and for which the width of the H' columns is HA, and R is a real number.

3. A solid-state imaging apparatus comprising:
a driving device that reads image data from an imaging unit, wherein
the driving device,
when reading the image data from the imaging unit, renders the image data composed of image data having V rows and H columns and blanking data having V' rows and H' columns, and
renders an amount of the image data changeable for at least every one frame, wherein the driving device reads the image data that satisfies equations (5) or (6):

$$A \text{ mode: } (H+H')V + H_1(V_A+1) + H_2 V_A + \alpha = \quad (5)$$

$$\frac{F_{clk}}{F_{xftrg}} \ (0 \le \alpha < 1 : \alpha \in R)$$

where Fxftrg is a frequency of an XFTRG signal that is input from outside the solid-state imaging apparatus, Fclk is a frequency of a CLK signal that is generated inside the solid-state imaging apparatus to synchronize with the XFTRG signal, H1 is a quantity of columns that constitute some columns of one image and for which a height of the V' rows is VA+1, H2 is a quantity of columns that constitute some columns of the one image and for which the height of the V' rows is VA, and R is a real number;

$$B \text{ mode: } (H+H')V + (H_1+1)(V_A+1) + (H_2-1)V_A + \beta = \quad (6)$$

$$\frac{F_{clk}}{F_{xftrg}} \ (-1 < \beta \le 0 : \beta \in R)$$

where Fxftrg is the frequency of the XFTRG signal that is input from outside the solid-state imaging apparatus, Fclk is the frequency of the CLK signal that is generated inside the solid-state imaging apparatus to synchronize with the XFTRG signal, H1+1 is a quantity of columns that constitute some columns of one image and for which the height of the V' rows is VA+1, H2−1 is a quantity of columns that constitute some columns of the one image and for which the height of the V rows is VA, and R is a real number.

4. The solid-state imaging apparatus according to claim 2, wherein the width of the H' columns of the blanking data is changeable for at least every one frame.

5. The solid-state imaging apparatus according to claim 3, wherein the height of the V' rows of the blanking data is changeable for at least every one frame.

6. The solid-state imaging apparatus according to claim 2, wherein the A mode and the B mode are alternately switched.

7. A solid-state imaging apparatus comprising:
a driving device that reads image data from an imaging unit, wherein
the driving device,
when reading the image data from the imaging unit, renders the image data composed of image data having V rows and H columns and blanking data having V rows and H columns, and
renders an amount of the image data changeable for at least every one frame so as to maintain synchronization between a frame rate of the image data and data transfer of the image data, wherein
the driving device comprises:
a difference detection unit that detects a difference between an external signal that is input from outside the solid-state imaging apparatus and an internal signal that is generated inside the solid-state imaging apparatus to synchronize with the external signal; and an adjustment unit that outputs an adjustment signal based on a detection result obtained by the difference detection unit, wherein the difference detection unit detects a difference between a left-hand side and a right-hand side of inequality (7), and the adjustment unit outputs the adjustment signal based on the detection result obtained by the difference detection unit and renders a value of the left-hand side of inequality (4) close to a real number of the right-hand side:

$$n = (H + H')(V + V') \neq \frac{F_{clk}}{F_{xftrg}} (n \in Z) \quad (7)$$

where Fxftrg is a frequency of an XFTRG signal that is input from outside the solid-state imaging apparatus, Fclk is a frequency of a CLK signal that is generated inside the solid-state imaging apparatus to synchronize with the XFTRG signal, and Z is an integer.

* * * * *